US008888028B2

(12) United States Patent
Tulipani

(10) Patent No.: US 8,888,028 B2
(45) Date of Patent: Nov. 18, 2014

(54) SHREDDER FOR LAWN VACUUM

(76) Inventor: Robert F. Tulipani, Newtown, CT (US)

( * ) Notice: Subject to any disclaimer, the term of this patent is extended or adjusted under 35 U.S.C. 154(b) by 582 days.

(21) Appl. No.: 13/150,701

(22) Filed: Jun. 1, 2011

(65) Prior Publication Data
US 2011/0297765 A1    Dec. 8, 2011

Related U.S. Application Data

(60) Provisional application No. 61/396,835, filed on Jun. 2, 2010.

(51) Int. Cl.
*B02C 18/24* (2006.01)
*A01G 1/12* (2006.01)

(52) U.S. Cl.
CPC ........................................ *A01G 1/125* (2013.01)
USPC ....................... 241/55; 241/101.78; 241/282.1

(58) Field of Classification Search
CPC .. B02C 18/141; B02C 18/144; B02C 18/186; B02C 18/06; B02C 18/10; B02C 18/24; B02C 23/18; B02C 2201/066
USPC .................... 241/18, 55, 282.1, 282.2, 101.78
See application file for complete search history.

(56) References Cited

U.S. PATENT DOCUMENTS

| | | | | |
|---|---|---|---|---|
| 2,038,284 A | * | 4/1936 | Hanson | 56/11.8 |
| 4,580,735 A | * | 4/1986 | Lange | 241/101.78 |
| 4,875,630 A | | 10/1989 | Carlson | 241/56 |
| 5,020,309 A | | 6/1991 | Hopkins | 56/13.3 |
| 5,156,084 A | | 10/1992 | Lin | 99/495 |
| 5,707,017 A | | 1/1998 | Paolucci et al. | 241/55 |
| 5,735,018 A | | 4/1998 | Gallagher et al. | 154/405 |
| 5,791,568 A | | 8/1998 | Keim | 241/47 |
| 6,490,850 B1 | | 12/2002 | Seegert et al. | 56/295 |
| D482,700 S | | 11/2003 | Lancaster | D15/17 |
| 6,675,569 B2 | | 1/2004 | Mannon et al. | 56/295 |

* cited by examiner

Primary Examiner — Mark Rosenbaum
(74) Attorney, Agent, or Firm — Harrington & Smith

(57) ABSTRACT

An apparatus including a gear assembly; a first blade section and a second blade section. The first blade section includes a first shaft. The first shaft is connected to gears of the gear assembly and extends from a first side of the gear assembly. The second blade section includes a second shaft and a cutting blade. The second shaft is connected to the gears of the gear assembly and extends from a second opposite side of the gear assembly. The gear assembly is configured to rotate the second shaft in an opposite direction of rotation relative to rotation of the first shaft.

27 Claims, 14 Drawing Sheets

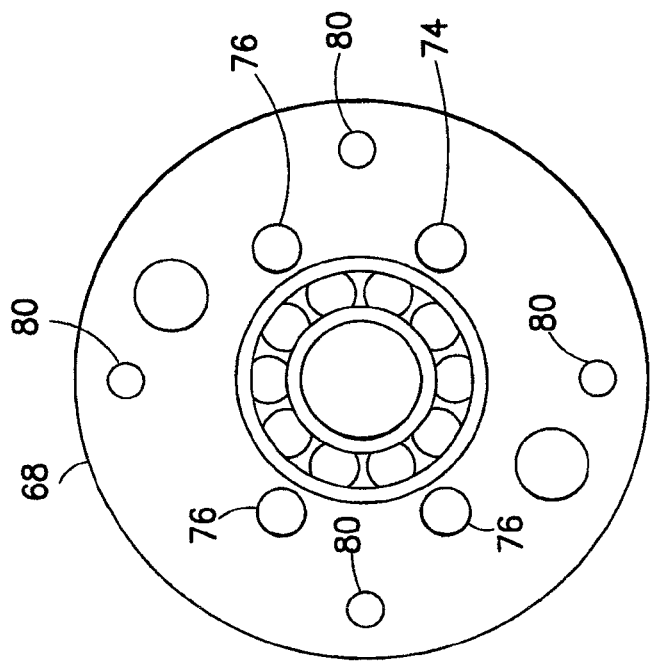
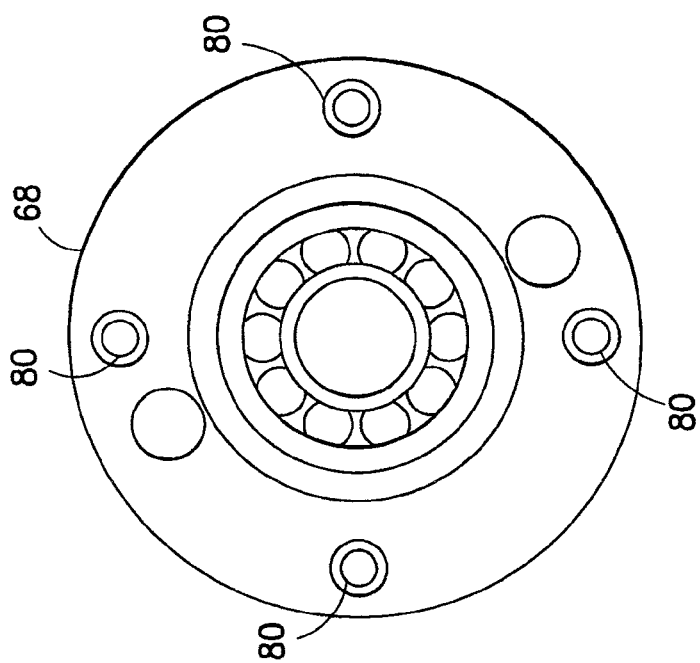
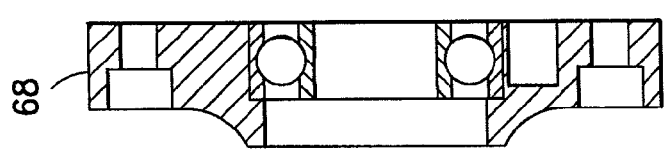

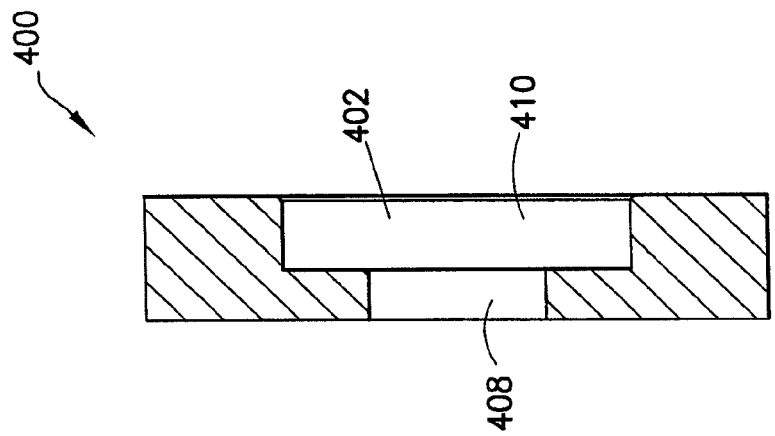
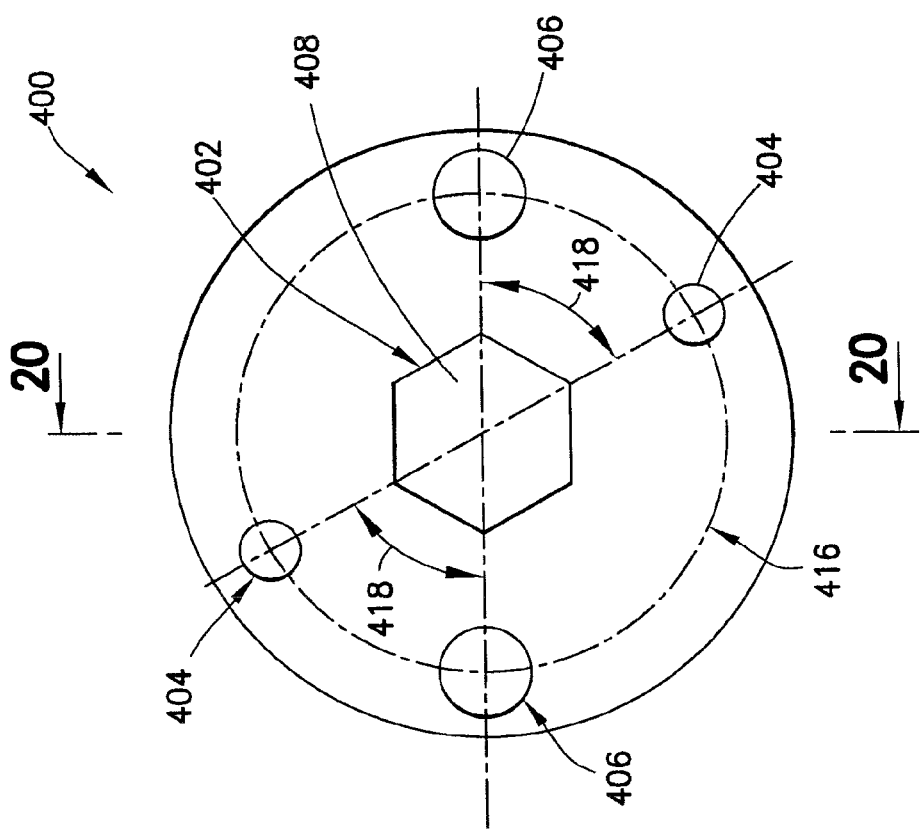
FIG.20
FIG.19

SHREDDER FOR LAWN VACUUM

CROSS REFERENCE TO RELATED APPLICATION

This application claims the benefit under 35 USC 119(e) of U.S. Provisional Patent Application No. 61/396,835 filed Jun. 2, 2010 which is hereby incorporated by reference in its entirety.

BACKGROUND

1. Field of the Invention

The invention relates to lawn and garden machines and, more particularly, to a shredder for shredding leaf and lawn debris.

2. Brief Description of Prior Developments

U.S. Pat. No. 5,707,017, which is hereby incorporated by reference in its entirety, describes a combination leaf and lawn debris blower, comminuting vacuum and wood chipper. U.S. Pat. No. 5,791,568, which is hereby incorporated by reference in its entirety, describes a leaf vacuum/chopper. U.S. Pat. No. 5,020,309, which is hereby incorporated by reference in its entirety, describes a leaf shredder attachment for a mower bagging system.

SUMMARY

The following summary is merely intended to be exemplary. The summary is not intended to limit the scope of the claims.

In accordance with one aspect, an apparatus is provided including a gear assembly; a first blade section and a second blade section. The first blade section includes a first shaft. The first shaft is connected to gears of the gear assembly and extends from a first side of the gear assembly. The second blade section includes a second shaft and a cutting blade. The second shaft is connected to the gears of the gear assembly and extends from a second opposite side of the gear assembly. The gear assembly is configured to rotate the second shaft in an opposite direction of rotation relative to rotation of the first shaft.

In accordance with another aspect, an apparatus is provided comprising a conduit configured to be directly connected to a fan impeller chamber of a vegetation blower; and a vegetation shredder configured to be mounted inside the conduit. The vegetation shredder comprises a first shaft configured to be removably connected to a drive shaft of a motor of the vegetation blower, a second shaft movably connected to the first shaft, and a plurality of blades mounted on the first and second shafts.

In accordance with another aspect, an apparatus is provided comprising a conduit; and an assembly comprising a gear box and two shafts extending from opposite sides of the gear box. The gear box is configured to rotate the shafts in opposite directions. The assembly is located in the conduit with an air flow path between an interior side of the conduit and an exterior lateral side of the gear box.

In accordance with another aspect, a method comprises longitudinally sliding a first shaft of a vegetation shredder attachment into a keyed connection located proximate a first side of a fan impeller section of a vegetation blower; and connecting a conduit of the vegetation shredder attachment to a front air intake side of a fan impeller chamber of the vegetation blower. The first shaft is adapted to be rotated through the keyed connection as the fan impeller section is rotated.

BRIEF DESCRIPTION OF THE DRAWINGS

The foregoing aspects and other features are explained in the following description, taken in connection with the accompanying drawings, wherein:

FIGS. 8A-8C, 9A-9C and 10A-10B show components of the gear assembly shown in FIGS. 2-4;

FIG. 19 is a front view of an alternate embodiment of the lock plate shown in FIGS. 5-6;

FIG. 20 is a cross sectional view of the lock plate shown in FIG. 19 taken along line 20-20;

DETAILED DESCRIPTION OF EMBODIMENTS

Figure 1:
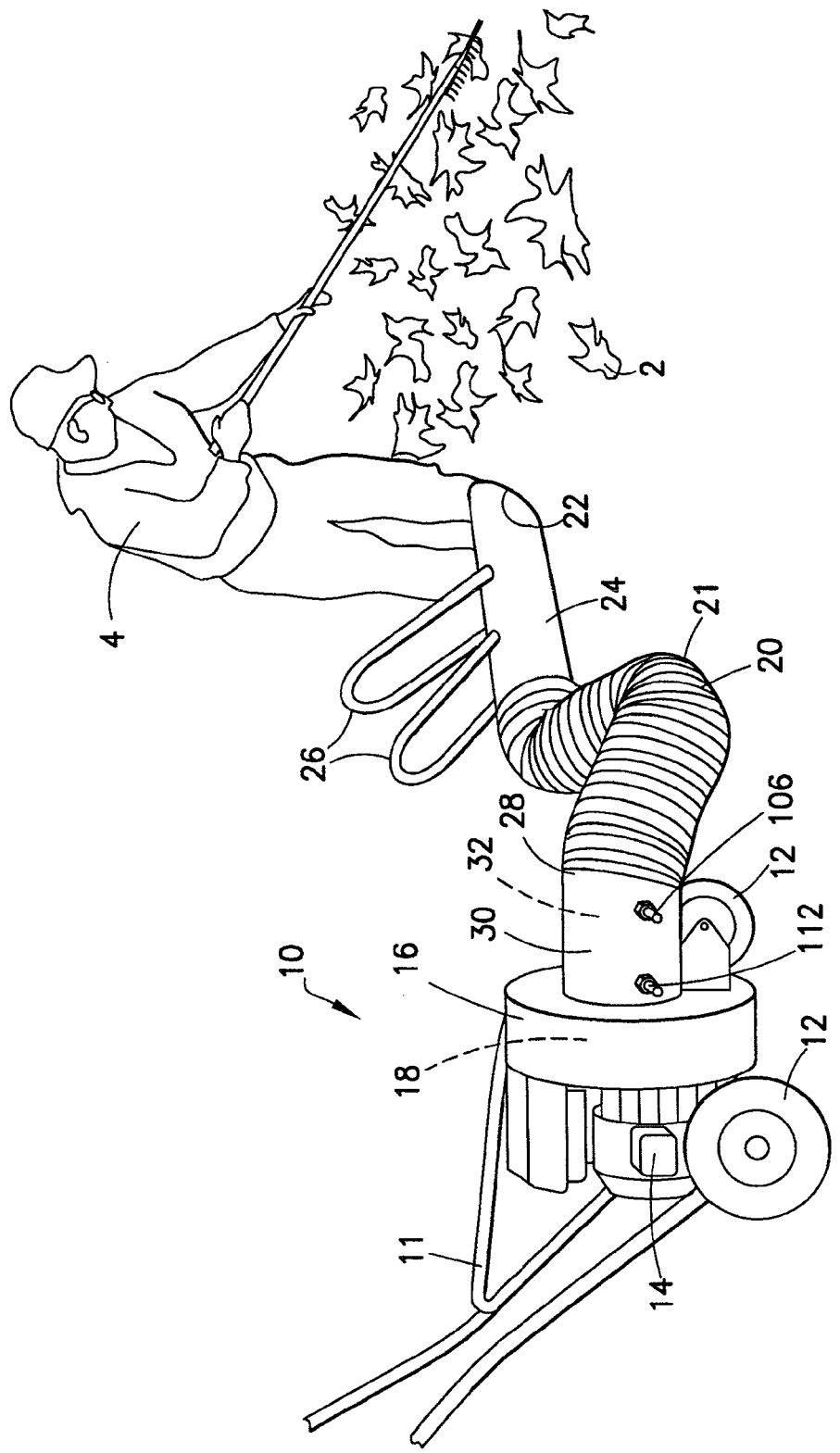
FIG. 1 shows an apparatus according to one example embodiment being used to vacuum vegetation by a user.

Referring to FIG. 1, there is shown an apparatus 10 incorporating features of one example embodiment. Although the invention will be described with reference to the example embodiments shown in the drawings, it should be understood that the invention can be embodied in many alternate forms of embodiments. In addition, any suitable size, shape or type of elements or materials could be used.

Figure 16:
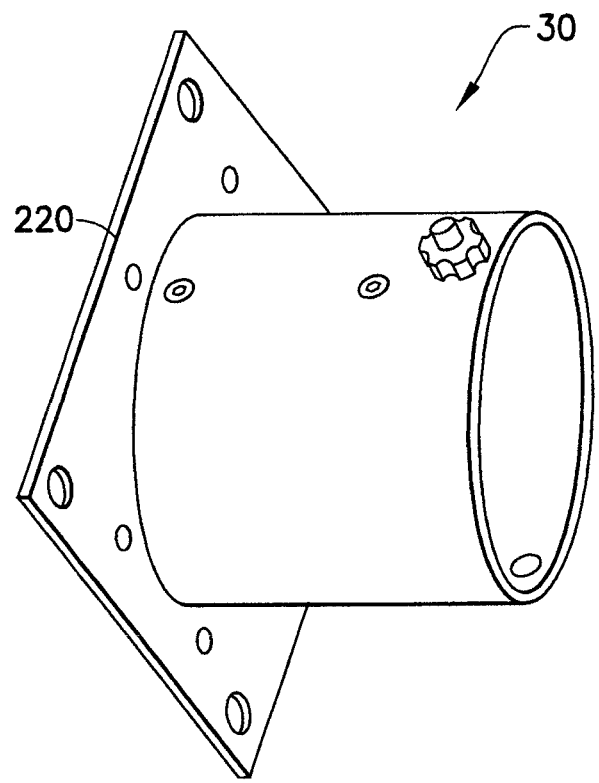
FIG. 16 is a perspective view of the conduit shown in FIG. 1.

The apparatus 10 is a blower/vac for leaf collection and lawn cleaning. Similar to the device described in U.S. Pat. No. 5,707,017, the apparatus 10 has a frame 11 with wheels 12, a motor 14, and chamber 16 with a fan impeller 18 connected to an output from the motor 14. In the embodiment shown, a vacuum tube 20 is connected to a front end of the chamber 16 to allow the apparatus to vacuum leaves and/or other lawn and garden debris 2. In the embodiment shown the vacuum tube 20 has a flexible tube 21, a front end 24 with an entrance 22, handles 26 for an operator 4 to move the front end 24 around, and a rear end 28 of the flexible tube 21 is attached to the chamber 16 by a conduit 30. In FIG. 1, the operator 4 is shown raking leaves 2 towards the entrance 22 to be sucked into the tube 20. The conduit 30 is attached to the front side of the chamber 16 such that the debris 2 can be sucked into the chamber 16 and pushed out a side exit from the chamber 16. In an alternate embodiment, any suitable exit from the chamber 16 could be provided. Referring also to FIG. 16, the conduit 30 is shown. The conduit 30 in this example embodiment has a plate section 220 which is attached by fasteners to the front side of the chamber 16. In another alternate embodiment, features of the invention could be provided in other types of apparatus, such as the devices shown in FIGS. 4 and 5 of U.S. Pat. No. 5,020,309 or, in another embodiment, with a blower/vac attached to a substantially enclosed leaf collection trailer towed by a truck.

Figure 2:
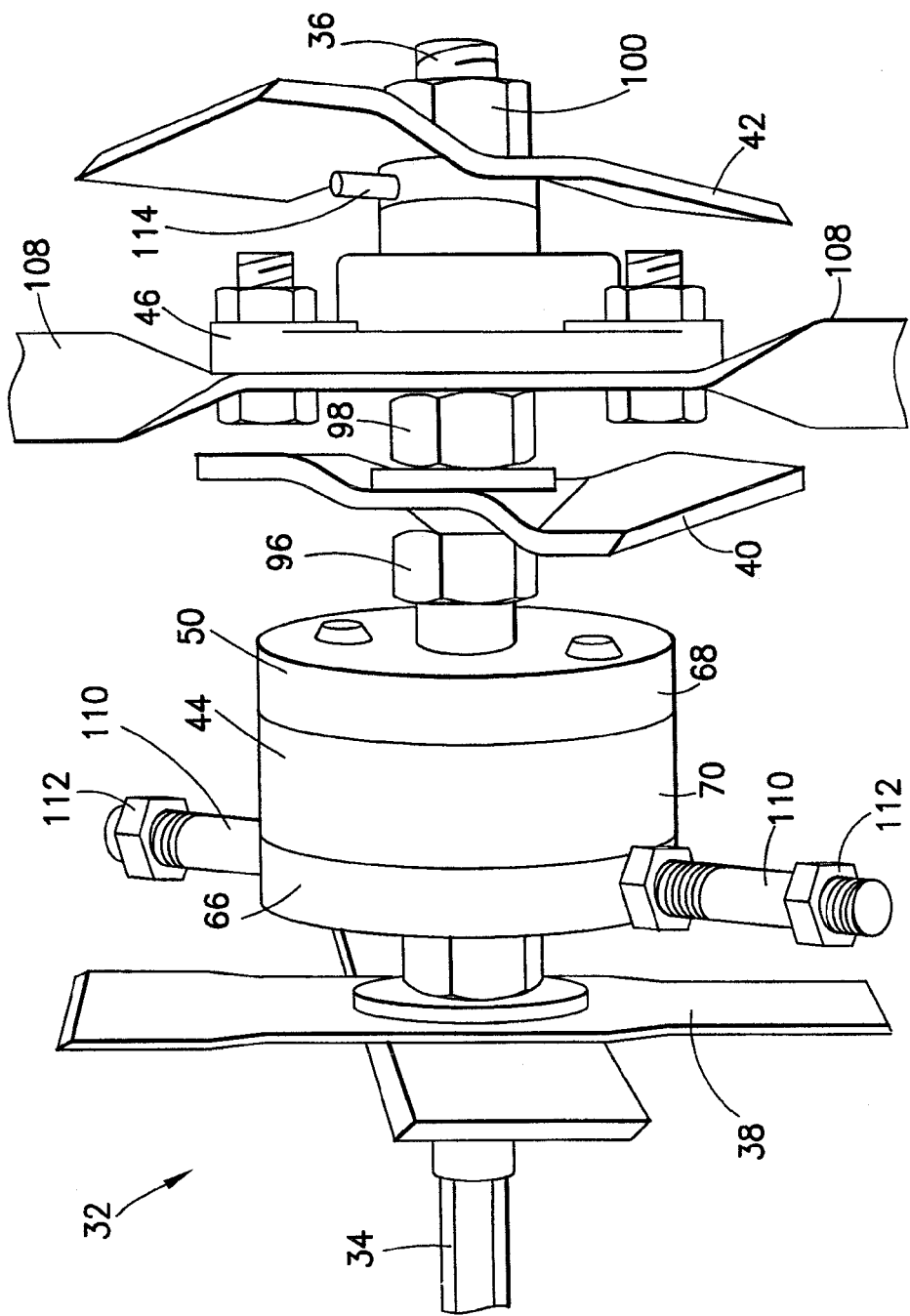
FIG. 2 is a side view illustrating some components of the example embodiment shown in FIG. 1.
Figure 3:
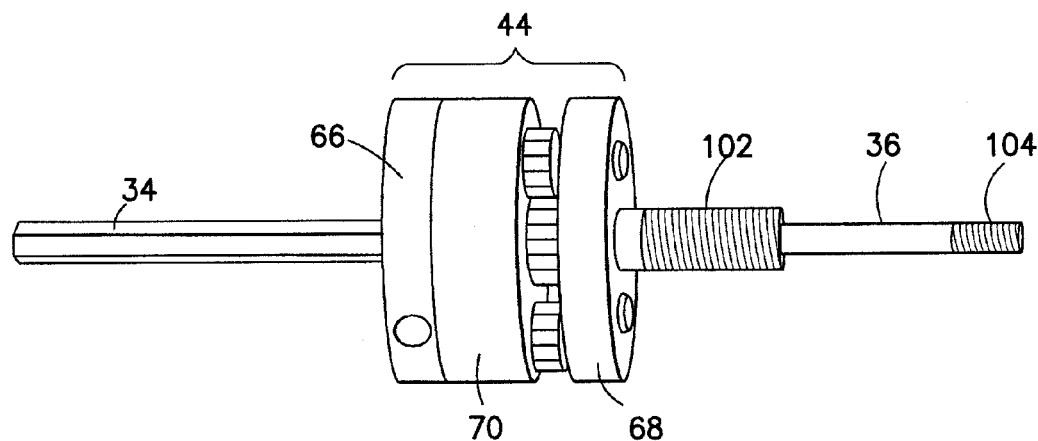
FIG. 3 is a side view of some of the components shown in FIG. 2.
Figure 4:
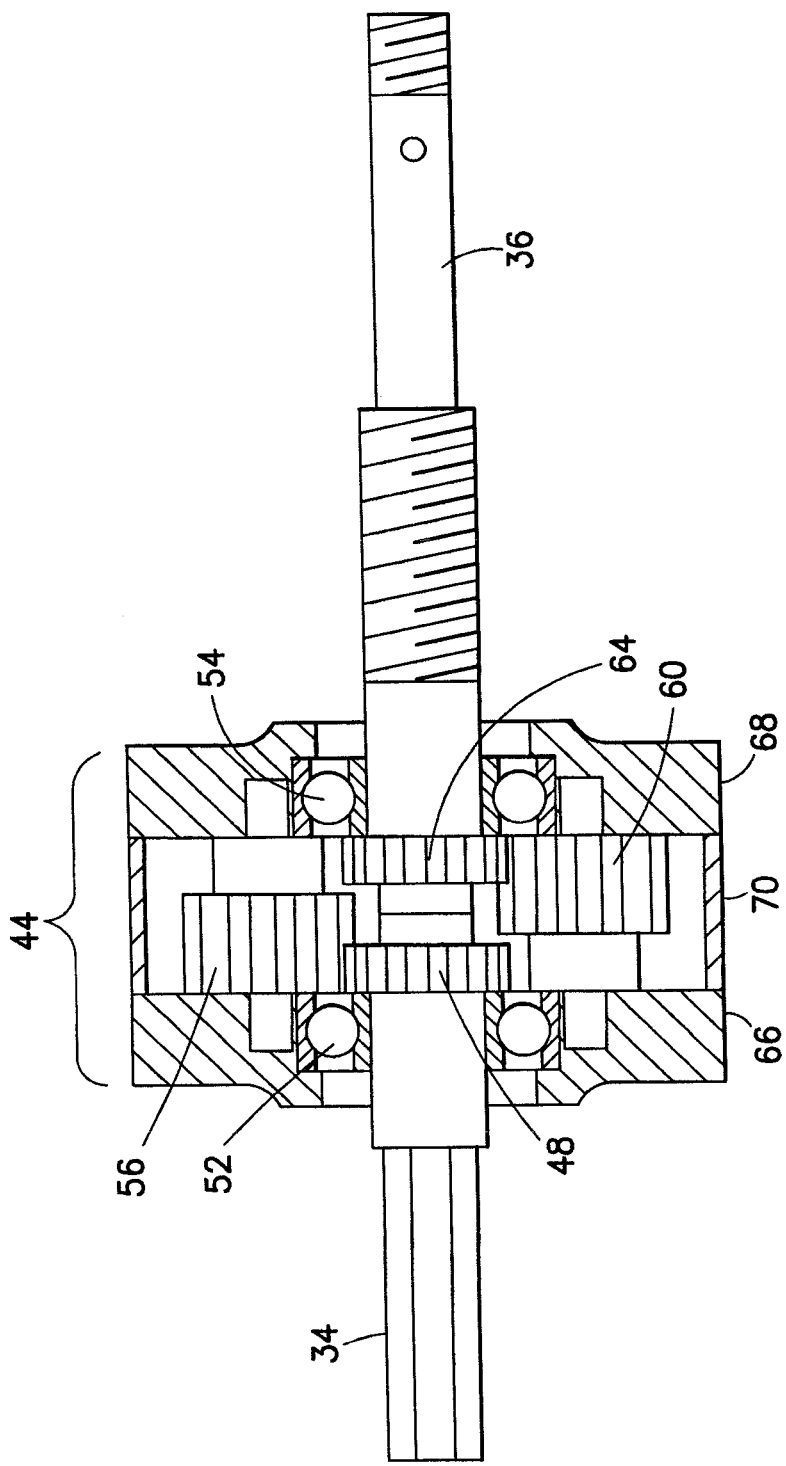
FIG. 4 is a cross sectional view of the components shown in FIG. 3.

Referring also to FIG. 2, located inside the conduit 30 is a shredder 32. The shredder 32 generally comprises two drive shafts 34, 36, three sets of blades 38, 40, 42, a gear assembly 44 and a support frame 46. Referring also to FIGS. 3-4, the second or front shaft 36 is connected to the first or rear shaft 34 by the gear assembly 44. FIG. 3 shows the gear assembly 44 slightly pulled apart to show some of the gears inside. The rear shaft 34, in this example embodiment, has a general hexagon shape. The rear shaft 34 is fixedly connected to the output drive shaft of the motor 14, in an outward extending position from the fan impeller 18.

Figure 5:
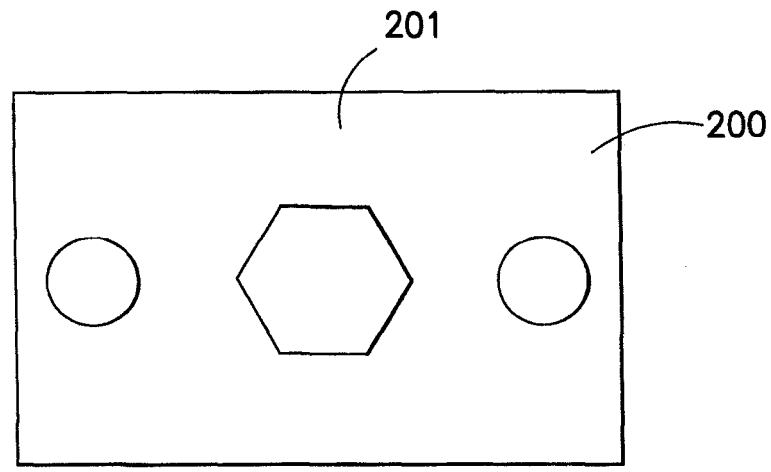
FIG. 5 is a front view of a lock plate used in a connection of the drive shaft with the shredder first shaft.

Referring also to FIG. 5, in this example, the fan impeller 18 is connected to the drive shaft of the motor 14 by a lock plate 200. In an alternate embodiment the lock plate could be round rather than rectangular. The lock plate 200 has a keyed aperture 201 which is sized and shaped to matingly receive the rear end of the first shaft 34. Thus, when the motor drive shaft rotates the impeller 18, because of the keyed connection of the first shaft 34 extending into the aperture 201, the lock plate 200 rotates first shaft 34.

Figure 6:
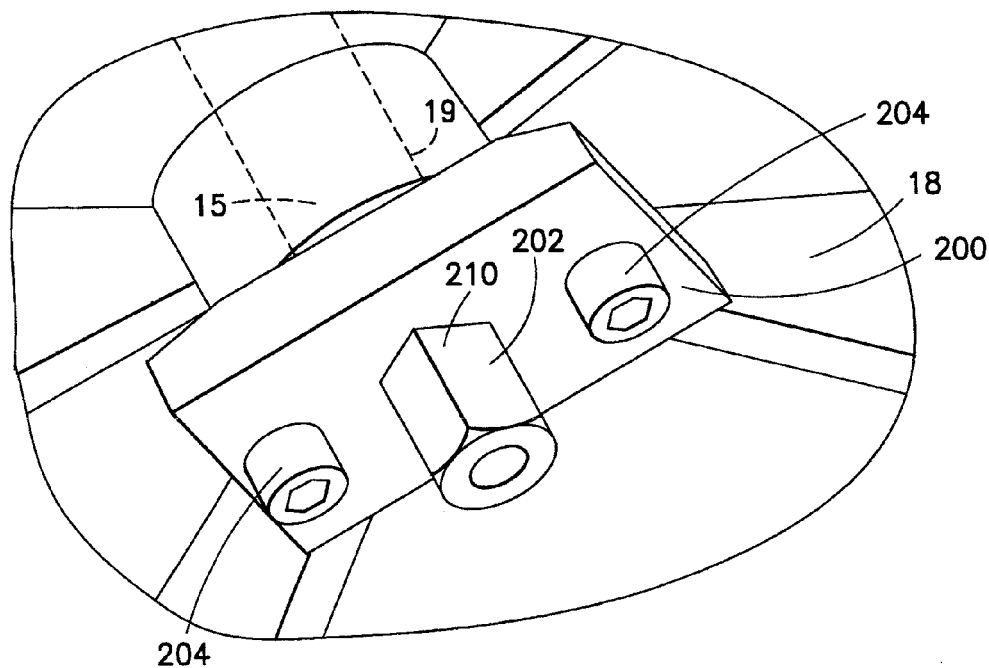
FIG. 6 is a perspective view of a connection of the fan impeller to the drive shaft with the lock plate shown in FIG. 5 and with a hex nut fastener.
Figure 7:
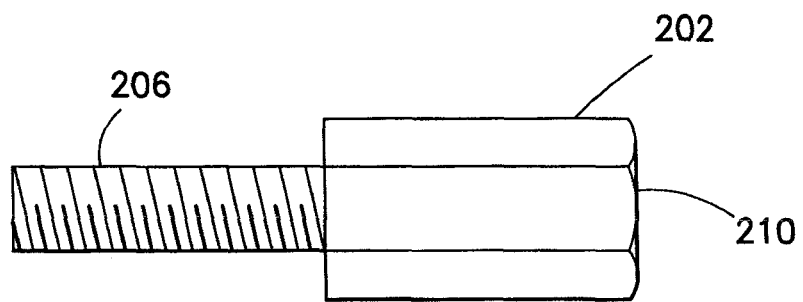
FIG. 7 is a side view of the fastener shown in FIG. 6.
Figure 8C:
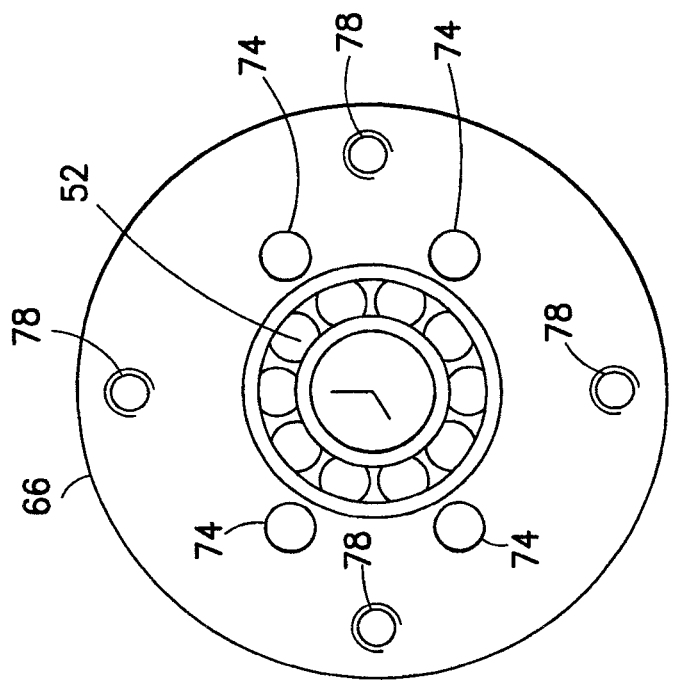
Figure 8B:
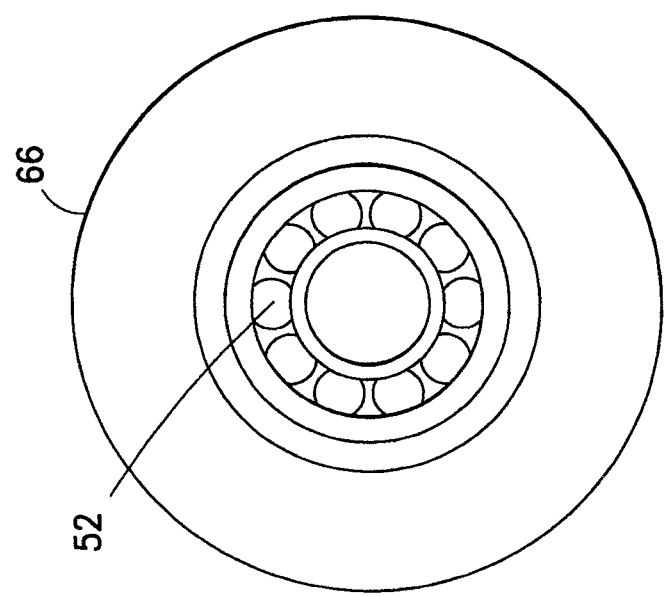
Figure 8A:
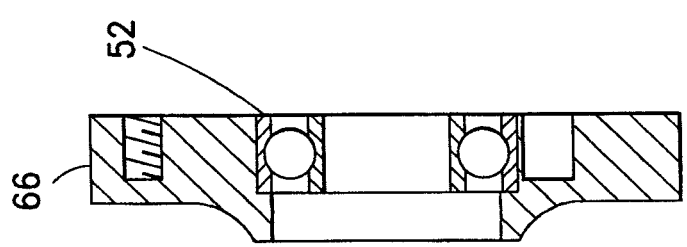
Figure 10B:
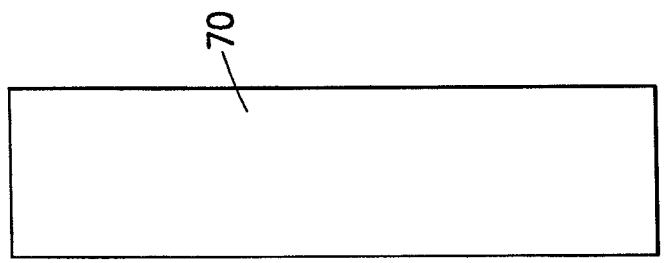
Figure 10A:
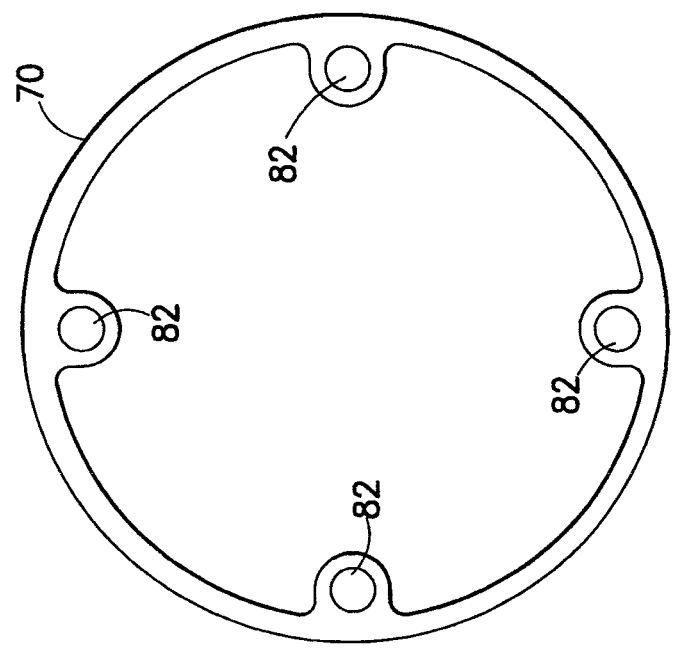
Figure 15:
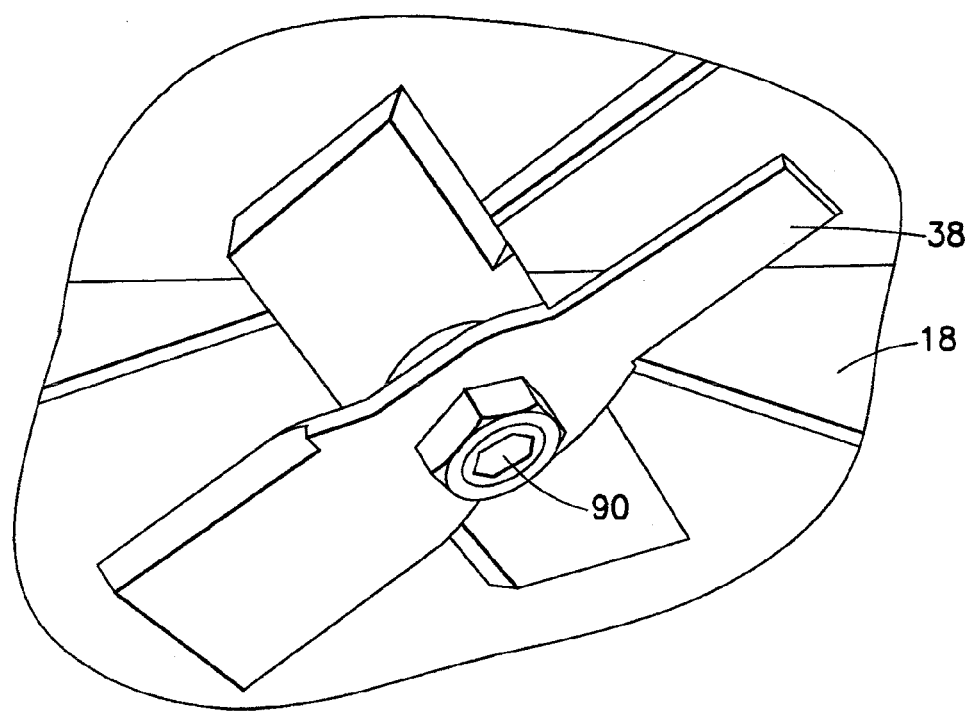
FIG. 15 is a perspective view showing the first cutting blade assembly of FIG. 14 mounted on the keyed end of the fastener shown in FIG. 6-7.

Referring also to FIGS. 6-7 and 15 an alternate embodiment is shown. A drive shaft fastener 202 is connected to the front end of the drive shaft 15. Two impeller fasteners 204 are used to connect the fan impeller 18 to the lock plate 200. The lock plate 200 receives the keyed end 210 of the fastener 202 in the slot 201. The lock plate 200 prevents the fastener 202 from rotating out of connection with the drive shaft 15. The impeller fan 18 has a central channel 19 which the drive shaft 15 extends through. The threaded end 206 of the fastener 202 is screwed into a threaded hole at the end of the drive shaft 15. The other end 210 of the fastener 202 is the same size and shape as the hole 201. The end 210 has a keyed shape. In this example embodiment the keyed shape is a polygon cross section, namely, a hexagon shape. The fasteners 204 stationarily attach the lock plate 200 to the impeller 18. Thus, the drive shaft 15 from the motor 14 is able to rotate the fan impeller 18 with the fastener 202.

The drive shaft 15 also is able to rotate the first shaft 34. The first shaft 34 could be directly connected to the drive shaft 15 of the motor. Alternatively, the first shaft 34 could be indirectly connected to the drive shaft 15 of the motor by an indirect connection. FIG. 2 shows the first shaft 34 extending past the rear end of the first blade assembly 38. However this is not necessary as further described below.

Figure 14:
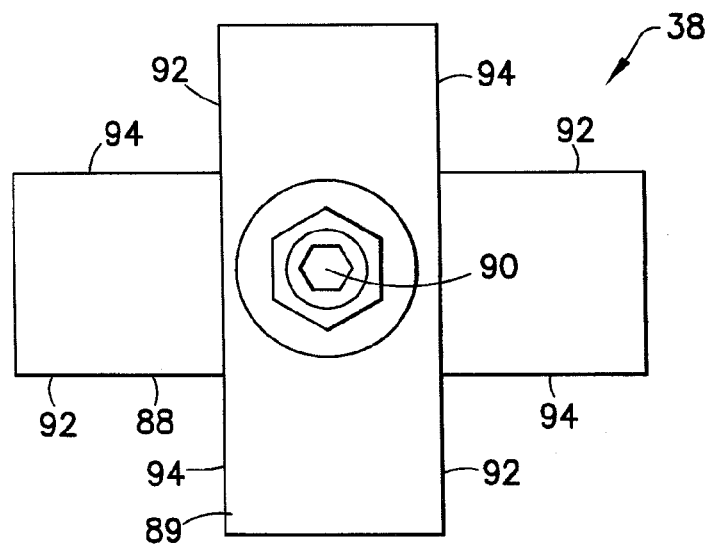
FIG. 14 is a front view of the first cutting blade assembly shown in FIG. 2.

Referring also to FIG. 14, the first set of blades 38 comprises two blade members 88, 89 connected together in a fixed structure with a hexagon keyed center aperture 90. For the embodiment of FIG. 6, the aperture 90 is slid onto the end 210 of the fastener 202. FIG. 15 shows the first cutting blade assembly 38 at its mounted position on the fastener 202 in front of the impeller 18. The first shaft 34 is slid into the opposite end (the open front end) of the aperture 90. When the drive shaft 15 is rotated, the fastener 202 is rotated. When the fastener 202 is rotated, the first set of blades 38 is rotated by the keyed connection of the end 210 with the aperture 90. When the first set of blades 38 is rotated the keyed connection between the aperture 90 and the first shaft 34 causes the first shaft 34 to rotate.

In this example embodiment, the leading edges 92 of the blade members 88, 89 are sharpened cutting edges. The tailing edges 94 could also be sharpened cutting edges. When it is desired, the first set of blades 38 may be removed from the shaft 34, flipped over, and then re-attached to the shaft 34 by a user for fast cutting edge replacement without having to immediately sharpen the first set of blades 38.

Referring back to FIG. 4, the front end of the first shaft 34 is connected to a first sun gear 48 in the gear assembly 44. Thus, when the first shaft 34 is rotated, it rotates the first sun gear 48. The gear assembly 44 comprises a frame 50, rear and front bearings 52, 54 and gears 50, 56, 58, 60, 62 and 64. In an alternate embodiment the front bearing 54 could be replaced by two or more bearings for more support of the input shaft 34.

Referring also to FIGS. 8A-8C, 9A-9C and 10A-10B, the frame 50 generally comprises a rear frame member 66, a front frame member 68 and a spacer/cover 70. The rear bearing 52 is press fit into the rear frame member 66. The rear shaft 34 extends into the rear bearing 52. The front bearing 54 is press fit into the front frame member 68. Four pins 72 extend between the front and rear frame members 66, 68 and are mounted in holes 74, 76. Four planet gears 56, 58, 60, 62 are separately rotatably located on the pins 72. Fasteners, such as bolts, are located in holes 78, 80, 82 to keep the assembly 44 together. The gear assembly 44 has a second sun gear 64 connected to the rear end of the front shaft 36. The two sun gears 48, 64 are generally in line with each other along the longitudinal axes of the shafts 34, 36. In this embodiment the ends of the shafts 34, 36 at the gear assembly 44 are splined or keyed in holes of the sun gears 48, 64 such that the sun gears and shafts rotate together. This can ease machining and assembly. However, in an alternate embodiment the ends of the shafts 34, 36 could be threaded and be screwed into the holes of the sun gears 48, 64. In another alternate embodiment, any suitable connection of the sun gears with the drive shafts could be provided.

Figure 11:
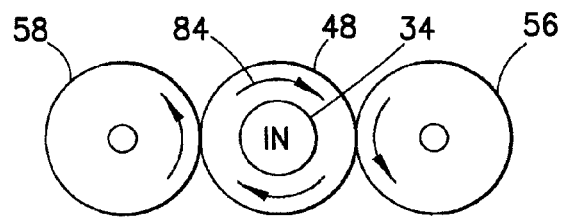
FIGS. 11-13 show sun and planet gears of the gear assembly shown in FIGS. 2-4.
Figure 12:
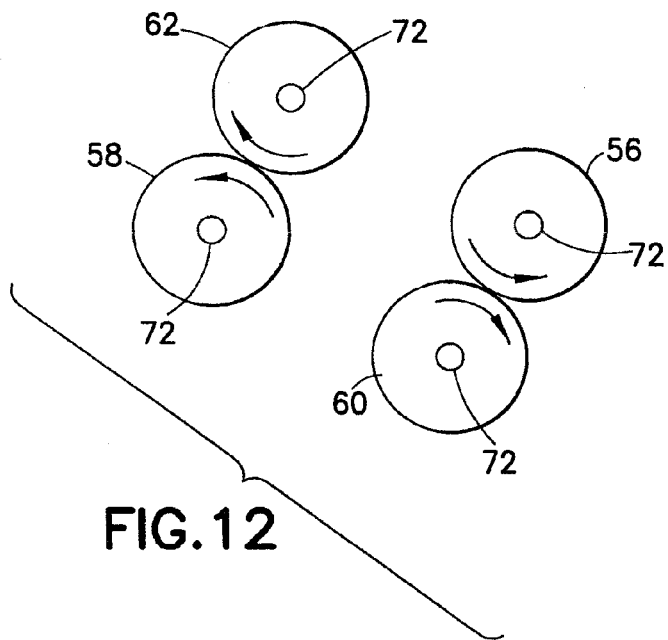
Figure 13:
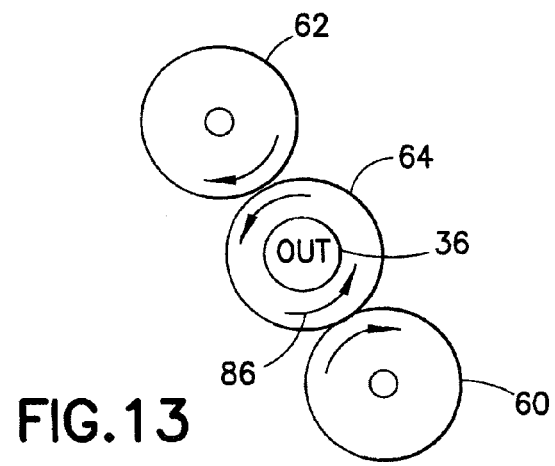

Referring also to FIGS. 11-13, two of the planet gears 56, 58 have their teeth intermeshed with the teeth of the first sun gear 48 as shown in FIG. 11. As seen in FIG. 13, two of the planet gears 60, 62 have their teeth intermeshed with the second sun gear 64. As seen in FIG. 12, the gear 56 also has its teeth intermeshed with the teeth of the gear 60, and the gear 58 has its teeth intermeshed with the teeth of the gear 62. Thus, when the first shaft 34 is rotated in direction 84 the gear assembly 44 causes the second shaft 36 to be rotated in an opposite second direction 86. This allows the first set of blades 38 to be rotated in an opposite direction relative to the second and third sets of blades 40, 42.

As seen in FIG. 2, in the embodiment shown the first set of blades 38 are different from the second and third sets of blades 40, 42, but the second and third sets of blades 40, 42 are substantially the same as each other (merely mounted at different angles on the front shaft 36. However, in an alternate embodiment the three sets of blades could be the same or all of them could be different. In addition only two sets of the blades might be provide, or more than three sets of the blades could be provide.

In the example embodiment shown in FIG. 2, the second and third sets of blades 40, 42 each comprise a single blade member; similar to a lawn mower blade. U.S. Pat. Nos. 6,675, 569, 6,490,850 and D482,700, which are hereby incorporated by reference in their entirety, describe some different types of lawn mower blades. Common to the lawn mower blades is a central aperture to mount the blade on a drive shaft and opposite sides which have a cutting leading edge and a raised trailing edge to create a fan type of movement of air and cuttings away from the blade.

In the embodiment shown the second and third sets of blades 40, 42 are mounted by nuts 96, 98 and 100 on threaded portions 102, 104 (see FIG. 3) of the front shaft 36. The support frame 46 has an inner bearing which is mounted on the front shaft 36 such that the support frame 46 can remain stationary while the front shaft 36 rotates. The support frame 46 is fixedly connected to the inner surface of the conduit 30 by fasteners 106 (see FIG. 1) on the wing arms 108 (see FIG. 2). As seen in FIG. 2, the frame 50 of the gear assembly has two spacer posts 110 which stationarily connect the frame 50 to the inner surface of the conduit 30 by fasteners 112. In one type of embodiment one or more of the blade assemblies could be connected to the front shaft 36 by shear pins 114.

With the example embodiment described above, as debris (such as leaves and twigs) pass though the tube 20 and enter the conduit 30, the front sets of blades 40, 42 cut the debris into smaller pieces. As the debris continues its path along the conduit 30 it is further cut by the rear set of blades 38. Because the rear set of blades 38 is rotated in a reverse direction relative to the front sets of blades 40, 42 the shredding of the debris is enhanced into smaller sizes than if the blades where all rotating in the same direction. This allows the debris to be stored in a much smaller volume because the air voids between the debris are now much smaller.

This is particularly useful when putting the now shredded debris into a compost heap because less air voids will accelerate the amount of time it takes of decomposition of the vegetation.

In addition, the shredded debris can be loaded in a trailer cart for transport to a land fill with less trips to the land fill being necessary; thereby reducing transport truck fuel consumption.

With the example described above, in addition to the vacuum created by the fan impeller 18 in the chamber 16, the front two blades 40, 42 also function as fan impellers to thereby increase the suction force at the entrance 22 of the tube 20 and help to decrease the risk of clogging of debris in the apparatus 10.

In one type of alternate embodiment the gear assembly 44 could be configured to provide a differential or different speed of rotation between the rear blade assembly 38 and the front two sets of blades 40, 42. In addition, any suitable type of gearing could be provide in the gear assembly 44 and is not intended to be limited to the sun and planet gear assembly described above. In addition, any suitable type of cutting blades could be provide.

Obviously, as the shredable material passes through the cutting area of the shredding device 32 it is cut or shredded into smaller pieces. Because the shredable material has been cut or shredded into smaller pieces various advantages are gained. First, because the shredable material is in smaller pieces, the pieces are relatively easier to be moved by the flow of air from the fan-like action of the blades. Thus, the relatively small pieces can be more easily and quickly transported out the side exit of the chamber 16 and/or through an exit tube to a storage area or container, reducing the risk of clogging of shredable material in the tubes. Second, when the shredable material is exited from the apparatus into a container or into a compost heap, it settles. Because the shredable material has been shred into relatively small pieces, the settling of the shredded material occurs in a denser manner, having relatively small air voids between collected material, thus allowing for collection of a larger amount of material in a more compact density in the container or the compost heap. Third, because collected material in a container is being stored in the container in a relatively denser and more compact manner, it takes longer for the container to become full. This allows for fewer stops by an operator for the purpose of emptying the container when it becomes full. Thus, this can reduce the time it takes to complete the operation over a given area. Fourth, because collectible material can be collected in a relatively denser and more compact manner, disposal of the collected material is relatively easier and can be less expensive, such as by using less trash bags to eventually dispose of the material. As is evident from the above description, the invention may be embodied in various forms or alternatives. Obviously, any suitable type of conduiting system may be provided. Any suitable type of vacuum or fan action for moving the shredable material through the conduiting system may be provided. Any suitable type of container may also be provided.

Preferably, the shredding device 32 is removably mounted in the conduit 30 and can be removed for servicing. Thus, the means for fastening the shredding device 32 to the conduit 30 may be comprised of means for relatively readily, easily and quickly mounting and dismounting the shredding device 32 with the conduit 30. The tube 20 and shredder 32 can be removed such that the apparatus can be used merely as a wheeled around blower and not a shredder.

One advantage of the example embodiment described above is the ability to reconfigure the apparatus 10 between a blower function and a vacuum/shredder function. The apparatus could be sold as a blower, and the shredder could be sold as an attachment accessory to convert the blower into a vacuum/shredder. Reconfiguration from the blower configured to the vacuum/shredder configuration can comprise removing a front air intake grill from the front side of the fan impeller chamber 16. Then, if not previously supplied as the fastener for the impeller 18, the lock plate 200 and fasteners 202, 204 can be attached. The first blade assembly 38 can be slid onto the keyed end 210. The first shaft 34 can be slid into the front side of the aperture 90. Because the spacers 110 connect the gear assembly to the channel 30, when the conduit 30 is attached to the front side of the chamber 16 the connections keep the first shaft 34 inside the aperture 90. To reconfigure the apparatus back to the blower function, the process is merely reversed where the first shaft 34 is slid out of the aperture 90, the first blade assembly 38 is merely slid off the end 210, and the front blower air intake grill is replaced.

Figure 17:
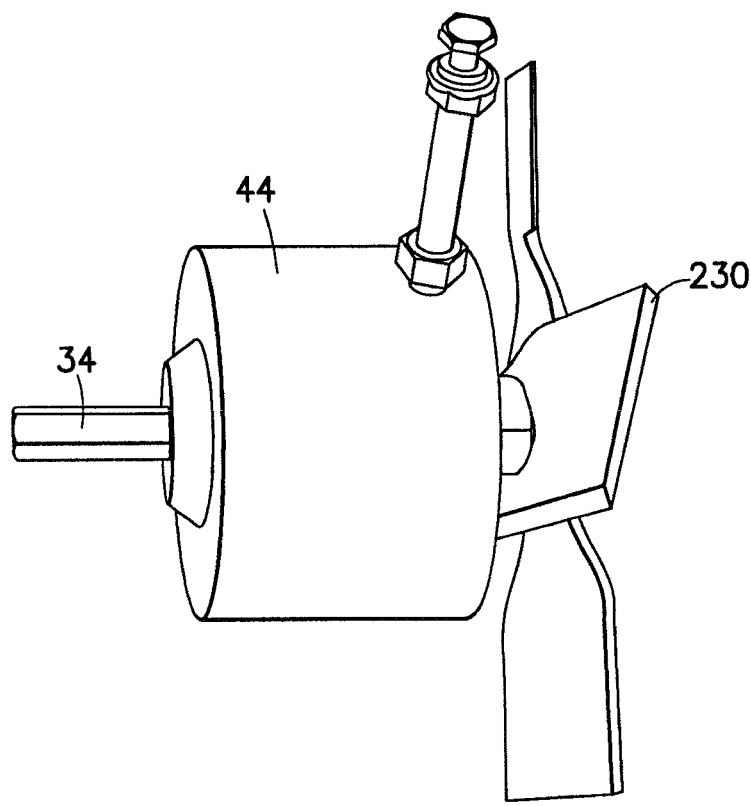
FIG. 17 is a perspective view of some components of an alternate embodiment of the vegetation shredder attachment.
Figure 18:
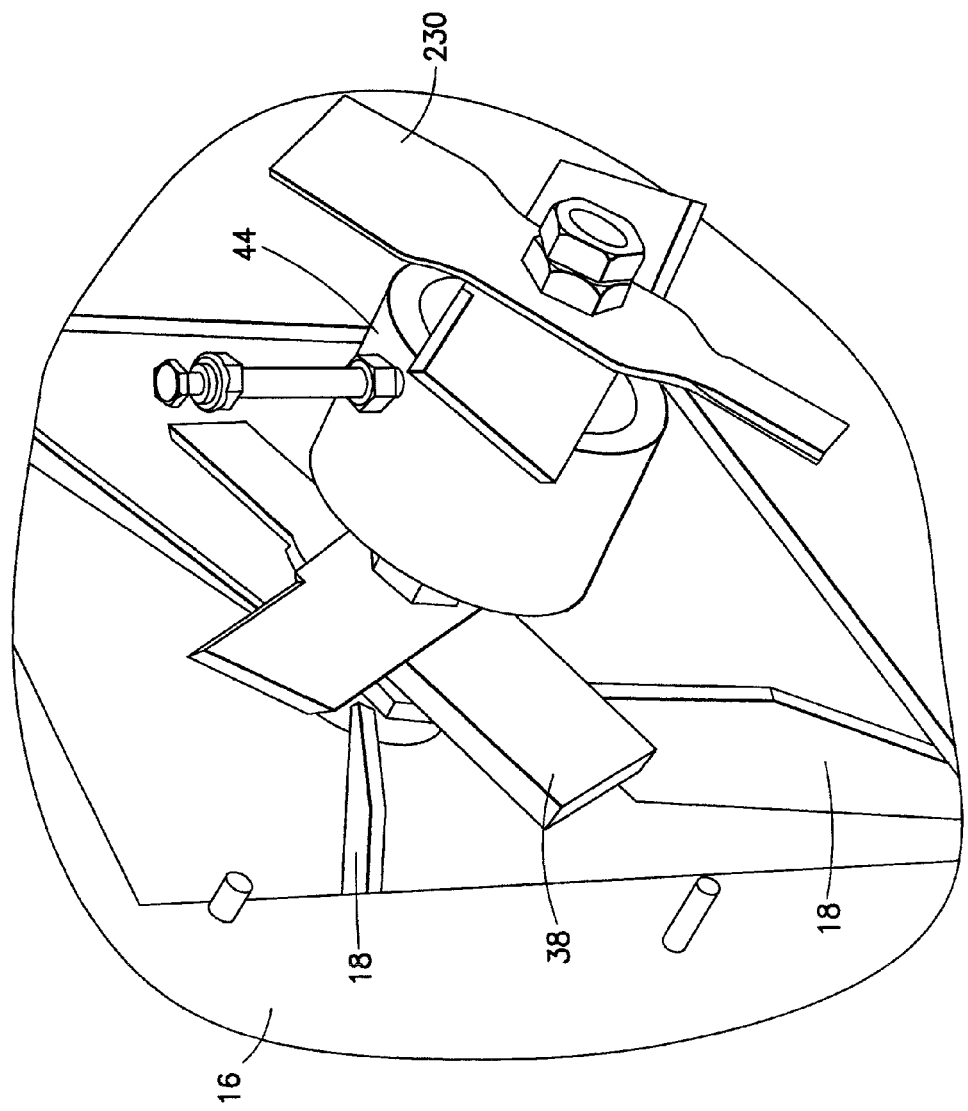
FIG. 18 is a perspective view of the attachment shown in FIG. 17 shown attached to the first blade assembly shown in FIG. 15 at the intake aperture through the fan impeller chamber of the apparatus.

Referring also to FIG. 17, an alternate example embodiment is shown. This embodiment comprises a vegetation shredder attachment 300 which can be used with the first blade assembly 38. This embodiment differs from the first embodiment in that it only has a single second blade assembly 230 at its front end. The second blade assembly 230 has four blade sections similar to the first blade assembly 38. This allows for a shorter second shaft extending from a front side of the gear assembly 44, and no need for the support frame 46. FIG. 18 shows the attachment 300 mounted with the first blade assembly 38 on the apparatus (but without showing the conduit 30 merely for the sake of clarity).

With an example embodiment an apparatus can be provided comprising a gear assembly; a first blade section comprising a first shaft, where the first shaft is connected to gears of the gear assembly and extends from a first side of the gear assembly; and a second blade section comprising a second shaft and a cutting blade, where the second shaft is connected to the gears of the gear assembly and extends from a second opposite side of the gear assembly. The gear assembly can be configured to rotate the second, shaft in an opposite direction of rotation relative to rotation of the first shaft.

The cutting blade can be a second cutting blade and the first blade section can comprise a first cutting blade. The apparatus can further comprise a fastener configured to be directly stationarily attached to an end of a drive shaft of a motor, where fastener comprises an end having a polygon shaped cross section. The first cutting blade can comprise an aperture having a polygon shaped cross section adapted to slide onto the polygon shaped end of the fastener. The first shaft can comprise a polygon shaped cross section which is configured to slide into the polygon shaped aperture of the first cutting blade. The apparatus can further comprise a conduit, where the gear assembly is configured to be connected inside the conduit by spacers to create an air flow path between an interior side of the conduit and an exterior lateral side of the gear assembly. A first end of the conduit can be configured to be attached to a front air intake side of a fan impeller chamber, and an opposite second end of the conduit can be configured to have a vegetation intake hose connected thereto. The cutting blade can comprise four blade sections extending from the second shaft, where the cutting blade is a second cutting blade and the first blade section comprises a first cutting blade, and where the first cutting blade comprises four blade sections extending from the first shaft. The cutting blade can comprise multiple cutting blades connected to the second shaft. The gear assembly can comprise at least two sun gears respectively connected to the first and second shafts, and at least four planet gears connecting the sun gears to each other. The apparatus can further comprise a motor, an fan impeller connected to a drive shaft of the motor, and where the first shaft is connected to the drive shaft to rotate with the drive shaft.

Another example embodiment can provide an apparatus comprising a conduit configured to be directly connected to a fan impeller chamber of a vegetation blower; and a vegetation shredder configured to be mounted inside the conduit, where the vegetation shredder comprises a first shaft configured to be removably connected to a drive shaft of a motor of the vegetation blower, a second shaft movably connected to the first shaft, and a plurality of blades mounted on the first and second shafts.

The second shaft can be movably connected to the first shaft by a gear assembly configured to rotate the second shaft in an opposite direction of rotation relative to rotation of the first shaft. The apparatus can further comprise spacers connecting the gear assembly to the conduit to provide an air flow path between the gear assembly and an interior side of the conduit. The first shaft can have a keyed cross sectional shape, and where the plurality of blades comprises a first blade with a mating keyed slot configured to be slidably positioned on the first shaft. The mating keyed slot of the first blade can be configured to be slidably located on a keyed end of a fastener which is attached to a drive shaft of a motor. The apparatus can further comprise a lock plate configured to attach to a front side of the fan impeller, where the lock plate is configured to be attached to the drive shaft by the fastener.

Another example embodiment can provide an apparatus comprising a conduit; an assembly comprising a gear box and two shafts extending from opposite sides of the gear box, where the gear box is configured to rotate the shafts in opposite directions; where the assembly is located in the conduit with an cut vegetation and air flow path between an interior side of the conduit and an exterior lateral side of the gear box.

Another example embodiment can provide a method comprising longitudinally sliding a first shaft of a vegetation shredder attachment into a keyed connection located proximate a first side of a fan impeller section of a vegetation blower; and connecting a conduit of the vegetation shredder attachment to a front air intake side of a fan impeller chamber of the vegetation blower, where the first shaft is adapted to be rotated through the keyed connection as the fan impeller section is rotated. The keyed connection can comprise a first blade having an aperture comprising a keyed cross sectional shape, where the aperture receives an end of a fastener connected to a drive shaft of a motor of the vegetation blower at one end of the aperture and an end of the first shaft of the vegetation shredder attachment is longitudinally slid into an opposite end of the aperture.

Figure 21:
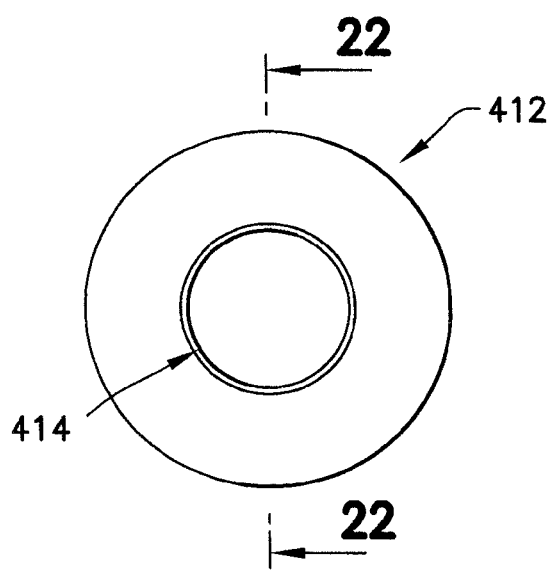
FIG. 21 is a front view of a washer used with the lock plate shown in FIGS. 19-20.
Figure 22:
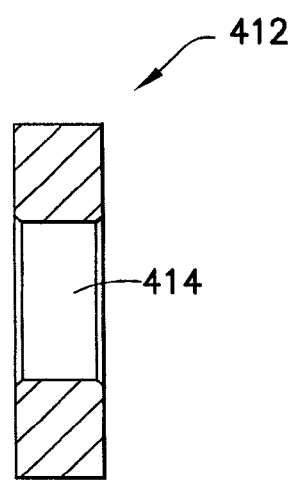
FIG. 22 is a cross sectional view of the washer shown in FIG. 21 taken along line 22-22.

Referring also to FIGS. 19-20, an alternate embodiment of the lock plate of FIGS. 5-6 is shown. The lock plate 400 comprises a center aperture 402, two template holes 404, and two fastener holes 406. The center aperture 402 comprises a front section 408 and a rear section 410. The front section 408 has a general hexagon shape. The rear section 410 has a general circular shape. The hexagon shaped front section 408 is sized and shaped to receive the keyed end 210 of the fastener 202 shown in FIG. 7. Referring also to FIGS. 21-22, the rear section 410 is sized and shaped to receive a washer 412. The inner aperture 414 of the washer 412 is sized and shaped to allow the threaded end 206 of the fastener 202, which is screwed into a threaded hole at the end of the drive shaft 15, to pass therethrough. Thus, the rear end of the keyed end 210 of the fastener 202 can rest on the front side of the washer 412. The washer 412 is sandwiched between the keyed end 210 of the fastener 202 and the front side of the drive shaft 15.

Referring back to FIGS. 19-20, the holes 404, 406 are aligned on a same radius 416 relative to the center axis of the center aperture 402. The two template holes 404 are each radially offset relative to a respective one of the fastener holes 406 by an angle 418. The angle 418 in this example is 60 degrees; which is an easy correlation between two apexes of the hexagon shaped section 408. The template holes 404 are smaller than the fastener holes 406. The template holes 404 have a radius which generally correspond to the radius of the threaded section of the fasteners 204 (see FIG. 6), but slightly smaller. The fastener holes 406 are sized to allow the threaded section of the fasteners 204 to easily pass therethrough, but smaller than the heads of the fasteners 204.

Conventional fan impellers, similar to impeller 18, do not have threaded holes to receive the threaded ends of the fasteners 204. The lock plate 400 can be used as a template to drill pilot holes in the impeller which can be subsequently tapped to create threads. In one example method, the fastener 202 and washer 412 can be attached to the drive shaft 15. The lock plate 400 can then be slid onto the hexagon shaped end 210 of the fastener 202 and against the front side of the fan impeller. A user can drive pilot holes through the two template holes 404. The user can then remove the lock plate 400, and tap the two pilot holes with threads for the fasteners 204. The user can then reinstall the lock plate 400 onto the hexagon shaped end 210 of the fastener, but rotated 60 degrees clockwise relative to its original position used to create the pilot holes. The fasteners 204 can now be placed in the holes 406 and screwed into the newly created threaded holes to fixedly attach the lock plate 400 to the fan impeller. The lock plate 400 prevents the fastener 202 front inadvertently unscrewing from the drive shaft 15. The lock plate 440 is, thus, able to be used for two functions: as a template for drilling pilot holes in a front side of an impeller which does not have holes for the fasteners 204, and as a lock plate for the fastener 202.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising;
a gear assembly;
a first blade section comprising a first shaft, where the first shaft is connected to gears of the gear assembly and extends from a first side of the gear assembly;
a second blade section comprising a second shaft and a cutting blade, where the second shaft is connected to the gears of the gear assembly and extends from a second opposite side of the gear assembly; and
a conduit, where the gear assembly is configured to be connected inside the conduit by spacers to create an air flow path between an interior side of the conduit and an exterior lateral side of the gear assembly,
where the gear assembly is configured to rotate the second shaft in an opposite direction of rotation relative to rotation of the first shaft.

2. An apparatus as in claim 1 where the cutting blade is a second cutting blade and the first blade section comprises a first cutting blade.

3. An apparatus as in claim 2 further comprising a fastener configured to be directly stationarily attached to an end of a drive shaft of a motor, where fastener comprises an end having a polygon shaped cross section.

4. An apparatus as in claim 3 where the first cutting blade comprises an aperture having a polygon shaped cross section adapted to slide onto the polygon shaped end of the fastener.

5. An apparatus as in claim 4 where the first shaft comprises a polygon shaped cross section which is configured to slide into the polygon shaped aperture of the first cutting blade.

6. An apparatus as in claim 1 where a first end of the conduit is configured to be attached to a front air intake side of a fan impeller chamber, and an opposite second end of the conduit is configured to have a vegetation intake hose connected thereto.

7. An apparatus as in claim 1 where the cutting blade comprises four blade sections extending from the second shaft, where the cutting blade is a second cutting blade and the first blade section comprises a first cutting blade, and where the first cutting blade comprises four blade sections extending from the first shaft.

8. An apparatus as in claim 1 where the cutting blade comprises multiple cutting blades connected to the second shaft.

9. An apparatus as in claim 1 further comprising a motor, an fan impeller connected to a drive shaft of the motor, and where the first shaft is connected to the drive shaft to rotate with the drive shaft.

10. An apparatus comprising:
a gear assembly;
a first blade section comprising a first shaft, where the first shaft is connected to gears of the gear assembly and extends from a first side of the gear assembly; and
a second blade section comprising a second shaft and a cutting blade, where the second shaft is connected to the gears of the gear assembly and extends from a second opposite side of the gear assembly,
where the gear assembly is configured to rotate the second shaft in an opposite direction of rotation relative to rotation of the first shaft,
where the gear assembly comprises at least two sun gears respectively connected to the first and second shafts, and at least four planet gears connecting the sun gears to each other.

11. An apparatus comprising:
a conduit configured to be directly connected to a fan impeller chamber of a vegetation blower;
a vegetation shredder configured to be mounted inside the conduit, where the vegetation shredder comprises a first shaft configured to be removably connected to a drive shaft of a motor of the vegetation blower, a second shaft movably connected to the first shaft, and a plurality of blades mounted on the first and second shafts, where the second shaft is movably connected to the first shaft by a gear assembly configured to rotate the second shaft in an opposite direction of rotation relative to rotation of the first shaft.

12. An apparatus as in claim 11 further comprising spacers connecting the gear assembly to the conduit to provide an air flow path between the gear assembly and an interior side of the conduit.

13. An apparatus as in claim 11 where the first shaft has a keyed cross sectional shape, and where the plurality of blades comprises a first blade with a mating keyed slot configured to be slidably positioned on the first shaft.

14. An apparatus as in claim 13 where the mating keyed slot of the first blade is configured to be slidably located on a keyed end of a fastener which is attached to a drive shaft of a motor.

15. An apparatus as in claim 14 further comprising a lock plate configured to attach to a front side of the fan impeller, where the lock plate is configured to be attached to the drive shaft by the fastener.

16. An apparatus as in claim 11 where the vegetation shredder comprises:
a first blade section comprising the first shaft and a first one of the blades, where the first shaft is connected to gears of the gear assembly and extends from a first side of the gear assembly; and
a second blade section comprising the second shaft and second one of the blades, where the second shaft is connected to the gears of the gear assembly and extends from a second opposite side of the gear assembly.

17. An apparatus as in claim 16 where the second blade is a second cutting blade and the first blade is a first cutting blade.

18. An apparatus as in claim 17 further comprising a fastener configured to be directly stationarily attached to an end of the drive shaft of the motor, where fastener comprises an end having a polygon shaped cross section.

19. An apparatus as in claim 18 where the first cutting blade comprises an aperture having a polygon shaped cross section adapted to slide onto the polygon shaped end of the fastener.

20. An apparatus as in claim 19 where the first shaft comprises a polygon shaped cross section which is configured to slide into the polygon shaped aperture of the first cutting blade.

21. An apparatus as in claim 16 where the gear assembly is configured to be connected inside the conduit by spacers to create an air flow path between an interior side of the conduit and an exterior lateral side of the gear assembly.

22. An apparatus as in claim 21 where a first end of the conduit is configured to be attached to a front air intake side of a fan impeller chamber, and an opposite second end of the conduit is configured to have a vegetation intake hose connected thereto.

23. An apparatus as in claim 16 where the second blade comprises four blade sections extending from the second shaft, where the second blade is a second cutting blade and the first blade is a first cutting blade, and where the first cutting blade comprises four blade sections extending from the first shaft.

24. An apparatus as in claim 16 where the second blade comprises multiple cutting blades connected to the second shaft.

25. An apparatus as in claim 16 where the gear assembly comprises at least two sun gears respectively connected to the first and second shafts, and at least four planet gears connecting the sun gears to each other.

26. Art apparatus as in claim 16 further comprising the motor, an fan impeller connected to the drive shaft of the motor, and where the first shaft is connected to the drive shaft to rotate with the drive shaft.

27. An apparatus comprising:
  a conduit;
  an assembly comprising a gear box and two shafts extending from opposite sides of the gear box, where the gear box is configured to rotate the shafts in opposite directions;
  where the assembly is located in the conduit with at least one spacer between the assembly and the conduit to create an air flow path between an interior side of the conduit and an exterior lateral side of the gear box.

\* \* \* \* \*